(12) United States Patent
Kochem et al.

(10) Patent No.: US 7,381,462 B2
(45) Date of Patent: Jun. 3, 2008

(54) LABEL FILM FOR IN-MOULD METHODS

(75) Inventors: Karl-Heinz Kochem, Neunkirchen (DE); Albert Lauer, Bexbach (DE); Mathias Roth, Zweibrücken (DE); Wilfrid Tews, Bechhofen (DE)

(73) Assignee: Treofan Germany GmbH & Co. KG (DE)

( * ) Notice: Subject to any disclaimer, the term of this patent is extended or adjusted under 35 U.S.C. 154(b) by 421 days.

(21) Appl. No.: 10/522,061

(22) PCT Filed: Jul. 23, 2003

(86) PCT No.: PCT/EP03/08049

§ 371 (c)(1),
(2), (4) Date: Jan. 20, 2005

(87) PCT Pub. No.: WO2004/014650

PCT Pub. Date: Feb. 19, 2004

(65) Prior Publication Data

US 2005/0260427 A1    Nov. 24, 2005

(30) Foreign Application Priority Data

Aug. 3, 2002 (DE) ............................. 102 35 557

(51) Int. Cl.
  *B32B 27/08* (2006.01)
  *B32B 27/32* (2006.01)
(52) U.S. Cl. ............... 428/319.7; 428/317.9; 428/319.3; 428/319.9; 428/336
(58) Field of Classification Search ............ 428/336, 428/317.9, 319.3, 319.7, 319.9
See application file for complete search history.

(56) References Cited

U.S. PATENT DOCUMENTS

| 4,997,700 | A | 3/1991 | Bothe et al. |
| 5,026,592 | A | 6/1991 | Janocha et al. |
| 5,096,770 | A | 3/1992 | Bothe |
| 5,498,474 | A | 3/1996 | Schuhmann et al. |
| 5,800,913 | A | 9/1998 | Mauer et al. |
| 6,183,856 | B1 * | 2/2001 | Amon ............. 428/318.4 |
| 6,572,960 | B2 * | 6/2003 | Amon ............. 428/315.9 |
| 2002/0015834 | A1 * | 2/2002 | Biddiscombe ........ 428/213 |
| 2004/0028932 | A1 | 2/2004 | Holzer et al. |

FOREIGN PATENT DOCUMENTS

| DE | 39 33 695 | 4/1991 |
| EP | 0 321 843 | 6/1989 |
| EP | 0 361 280 | 4/1990 |
| EP | 0 236 945 | 3/1993 |
| EP | 0 623 463 | 11/1994 |
| EP | 0 715 951 | 6/1996 |
| WO | WO-02/45956 | 6/2002 |

* cited by examiner

*Primary Examiner*—D. S. Nakarani
(74) *Attorney, Agent, or Firm*—Connolly Bove Lodge & Hutz LLP

(57) ABSTRACT

The invention relates to a biaxially-oriented opaque polypropylene multi-layer film, made from a base layer, at least one first intermediate layer arranged thereon and a first surface layer arranged on the first intermediate layer. The first intermediate layer has essentially no vacuoles. The first surface layer comprises at least 80 wt. % of a propylene/ethylene copolymer with an ethylene content of 1.2 to <2.8 wt. % and a propylene content of 97.2-98.8 wt. %, a melting point in the range 145 to 160° C. and a fusion enthalpy of 80 to 110 J/g. The base layer comprises vacuoles and has a density in the range 0.35 to 0.6 g/cm³. The invention further relates to the use of said film for the in-mould labeling of containers made from thermoplastic polymers.

18 Claims, No Drawings

LABEL FILM FOR IN-MOULD METHODS

RELATED APPLICATIONS

This application is a national stage application (under 35 U.S.C. 371) of PCT/EP2003/008049 filed Jul. 23, 2003 which claims benefit to German application serial number 102 35 557.6 filed Aug. 3, 2002.

The present invention relates to a polypropylene film having a low density and its use as an in-mold label, as well as a method for manufacturing this film.

Label films comprise an extensive and technically complex field. Various labeling technologies are differentiated, which differ in regard to the process conditions and place varying technical requirements on the labeling materials. All labeling processes share the feature that visually appealing labeled containers must result as the final product, in which good adhesion of the label to the container must be ensured.

In the labeling method, greatly varying technologies for applying the label are used. One differentiates between self-adhesive labels, wraparound labels, shrink labels, in-mold labels, patch labeling, etc. The use of a film made of thermoplastic as a label is possible in principle in all of these different labeling methods.

All in-mold labeling methods share the feature that the label participates in the actual molding method of the container and is applied during this method. In this case, different molding methods are used, such as injection molding methods, blowmold methods, and deep drawing methods.

In the injection molding method, a label is laid in the injection mold and molten plastic is injected behind it. Due to the high temperatures and pressures, the label bonds to the injection molded part and becomes an integral, non-removable component of the molding. Cups and covers for ice cream or margarine packages are manufactured according to this method, for example.

For this purpose, individual, typically preprinted labels are taken from a stack or cut from a roll and laid in the injection mold. The mold is designed in this case in such a way that the melt flow is injected behind the label and the printed front of the film presses against the wall of the injection mold. During the injection, the hot melt bonds to the label. After the injection, the mold opens, and the molding with the label is ejected and cools down. In the result, the label must adhere to the container without wrinkles and in a visually perfect way.

The injection pressure is in a range from 300 to 600 bar during injection. The plastics used have a melt-flow index of approximately 40 g/10 minutes. The injection temperatures are a function of the plastic used. In many cases, the mold is additionally cooled in order to avoid sticking of the labeled molding to the mold.

In deep drawing, unoriented thick plastic slabs, usually cast PP (polypropylene) or PS (polystyrene) in a thickness of approximately 200 µm, are heated and drawn or pressed into a corresponding molding tool using vacuum or stamping tools. In this case as well, the individual label is laid in the mold and bonds to the actual container during the molding process. Significantly lower temperatures are used, so that the adhesion of the label to the container may be a critical factor. Good adhesion must also be ensured at these low processing temperatures. The processing speeds of this method are lower than in injection molding.

Direct in-mold labeling is also possible in blow molding of containers or hollow bodies. In this method, a melt tube is extruded vertically downward through an annular nozzle. A vertically divided molding tool moves together and encloses the tube, which is pinched together at the bottom end at the same time. At the upper end, a blow pin is introduced, through which the opening of the molding is implemented. Air is supplied to the hot melt tube via the blow pin, so that it expands and presses against the inner walls of the molding tool. At this time, the label must bond to the viscoelastic plastic of the melt tube. Subsequently, the mold is opened and the excess is cut off of the molded opening. The molded and labeled container is ejected and cools down.

For this blow molding method, the pressure inflating the melt tube is approximately 4-15 bar and the temperatures are significantly lower than in injection molding. The plastic materials have a lower MFI than in injection molding in order to form a dimensionally-stable melt tube and therefore behave differently than the low-viscosity materials for injection molding.

In this blow molding method as well, biaxially oriented films made of thermoplastics are increasingly used to label containers when molding. The films must have a selected property profile for this purpose, in order to ensure that the label film and the blown molded body contact one another smoothly and without bubbles and bond to one another.

Although currently polypropylene films are successfully used in the different in-mold labeling methods, problems still arise, for which no satisfactory solution has yet been found. For example, sometimes the outside of the label film sticks to the mold in which the label is laid and thus interference occurs in the production cycle. This sticking may occur due to adhesion of the printing inks to the surface of the injection mold in the printed region of the label or, if the printing is not over the entire area, due to too strong adhesion of the unprinted film surface to the mold. The film sticks to the mold and is more or less torn upon opening. Label residues remain suspended in the mold and the molded container is not correctly labeled and must be discarded.

Errors of this type are caused partially by contamination of molds which may arise after long production cycles. For example, components of printing inks accumulate on the surface of the mold, which undesirably favor this sticking. This problem is partially connected to the process conditions during molding. Thus, temperatures and injection pressure during in-mold injection molding are especially high, so that the entire film is briefly heated strongly in the region of the injection point and simultaneously pressed to the mold in this region by a high injection pressure. Because of these conditions, problems increasingly occur precisely in this region due to sticking to the mold. The film tears in the region of the injection point, delaminates, and finally hangs in tatters, partially on the inside of the mold and partially on the surface of the container.

In the scope of the present invention, it was found that this undesired delamination occurs increasingly in opaque films, whose mechanical strength is weaker, due to vacuoles inside the film, than with comparable transparent or white pigmented embodiments. Furthermore, it has been found that particularly opaque films having an especially low density cannot withstand the mechanical stresses during in-mold labeling and delaminate especially frequently. This appears understandable, since the mechanical strength of the polymer matrix becomes weaker if the density is reduced further by more and more vacuoles. However, films having lower density are required by the users precisely in the labeling field, since the reduced density offers a higher surface yield and therefore lower costs.

EP 0 715 951 describes a multilayered opaque film having improved tendency to split. The film has an at least three-layered construction made of a base layer and at least one intermediate layer applied to the base layer and a surface layer lying thereon. The base layer contains 2 to 30 weight-percent vacuole-initiating particles to reduce the density. The intermediate layer additionally contains 1 to 25 weight-percent vacuole-initiating particles and at least 2 weight-percent $TiO_2$. The film is distinguished by different structures of the intermediate and base layer, through which a high degree of whiteness is achieved in connection with low tendency to split and low area weight. However, these films are subject to the disadvantage that the vacuole-containing intermediate layer negatively influences the gloss of the film.

EP 0 321 843 describes a film having improved inherent delamination stability, which is constructed from a base layer and two transparent surface layers. The base layer contains a mixture of polypropylene, fillers to generate the vacuoles, and 5 to 30 weight-percent of a hydrocarbon resin. According to this teaching, the addition of resin improves the delamination stability of the films. However, these films are subject to the disadvantage that resin is a problematic component. Firstly, the use of resin raises the raw material costs. Volatile components of the resin may vaporize and lead to deposits on the rolls during the manufacturing or processing of the film. Finally, the resin increases the blocking tendency of the film and leads to problems when unstacking during processing.

DE 39 33 695 describes a non-sealable film comprising a base layer made of polypropylene and at least one surface layer, which is constructed from a special ethylene-propylene copolymer. This copolymer is distinguished by an ethylene content of 1.2 to 2.8 weight-percent and a distribution factor of >10 and a melting enthalpy of >80 J/g and a melt-flow index of 3 to 12 g/10 minutes (21.6 N and 230° C.). According to the description, the properties of the copolymer must be kept within these narrow limits to improve the printability and the visual properties.

The present invention is based on the object of providing an opaque film having low density which is to have improved mechanical stability during in-mold labeling. In consideration of a good yield, the film is to have a low density, generally less than 0.7 g/cm³, but be reliably usable in the different in-mold labeling methods, without delamination of the film occurring when the mold is opened. In the scope of the present invention, it was found that for this purpose the tendency to split of the film must be reduced and/or the initial tear resistance must be increased. The object is therefore also to provide a film having lower density and higher initial tear resistance. Of course, the desired usage properties of the film in regard to its use as a label film must otherwise be maintained. Thus, for example, the film is still to have a good appearance, a high degree of whiteness, good printability, and good antistatic properties in consideration of the unstacking ability, etc.

The object upon which the present invention is based is achieved by a biaxially oriented opaque polypropylene multilayered film made of a base layer, which contains polypropylene and vacuole-initiating fillers, and at least one first intermediate layer positioned thereon and a first surface layer positioned on the first intermediate layer, the film having a density of less than 0.7 g/cm³, distinguished in that the first intermediate layer essentially has no vacuoles and the first surface layer contains at least 80 weight-percent of a random propylene-ethylene copolymer, which has an ethylene content of 1.2 to 2.8 weight-percent and a propylene content of 97.2 to 98.8 weight-percent and a melting point in the range from 145 to 160° C. and a melting enthalpy in the range from 80 to 110 J/g.

It has been found that the modification of the surface layer polymers has an influence on the initial tear resistance of the film. Surprisingly, comparable films having a polypropylene copolymer surface layer, whose ethylene content is above 3 weight-percent and whose melting point is below 145° C. and whose melting enthalpy is below 80 J/g, have significantly lower initial tear resistances. Typically, the label films having surface layers made of propylene copolymers are provided with a higher ethylene content, in order to ensure good printability which is stable for a long time. These copolymers having an ethylene content between 3 and 6 weight-percent have established themselves as the standard for all applications in which printability and/or sealability of the film is required.

The connection between the special copolymer of the surface layer according to the present invention and the initial tear resistance of the film is not completely scientifically understood. However, it has been reproducibly shown that the cited parameters of the copolymer must be kept within these narrow limits in order to achieve improved initial tear resistance.

If the ethylene content is below 1.2 weight-percent, the printability is impaired, since then the effect of the surface treatment, which is a requirement for good printability, is no longer stable for a long time. With an ethylene content of less than 1.2 weight-percent, the surface tension falls by more than 6 mN/m within 12 weeks, at typical starting values of approximately 40 mN/m. The films are then frequently complained about because of poor printing ink adhesion. If the ethylene content is above 3 weight-percent and the melting point is below 145° C., the films display good corona maintenance, which, starting from 40 mN/m, is still at approximately 37 mN/m after 12 weeks, but the initial tear resistance is significantly worse than in the films according to the present invention. Films according to the present invention have values for the initial tear resistance in the range from 3.0 to 4.5 N/15 mm. The increase of the ethylene content to 4 weight-percent and the reduction of the melting point to approximately 136° C., for example, worsens the initial tear resistance to approximately 1.0 to 2.5 N/15 mm.

The propylene copolymers having low ethylene content and high melting point used according to the present invention are known per se. Thus, different teachings describe the advantageous use of these raw materials. For example, it is specified in EP 0 361 280 that this material is advantageous as a surface layer in films which may be metal coated. DE 39 33 695 describes improved adhesive properties of these surface layers. However, it was neither known or foreseeable that these copolymers would have a favorable effect on the initial tear resistance, which was too low, as a surface layer in an opaque film having low density.

For the purpose of the present invention, propylene-ethylene copolymers having an ethylene content of 1.2 to 2.8 weight-percent, particularly 1.5 to 2.3 weight-percent, are especially preferred. The melting point is preferably in a range from 150 to 155° C. and the melting enthalpy is preferably in a range from 90 to 100 J/g. The melt-flow index is generally 3 to 15 g/10 minutes, preferably 3 to 9 g/10 minutes (230° C., 21.6 N DIN 53735).

In general, the first surface layer contains at least 80 weight-percent, preferably 95 to 100 weight-percent, particularly 98 to <100 weight-percent of the copolymers described. In addition to this main component, the surface layer may contain typical additives such as antiblocking agents, lubricants, antistatic agents, stabilizers, and/or neutralization agents in the particular effective quantities. Small quantities of a second different propylene polymer may possibly be included, whose proportion is preferably below 20 weight-percent, however. Embodiments of this type are not preferable, but are conceivable if, for example, additives are incorporated via concentrates which are based on other polymers, such as propylene homopolymer or other propylene mixed polymers.

The thickness of this first surface layer is generally in a range from 0.5 to 5 μm, preferably 0.5 to 3 μm. To improve the adhesive properties, particularly the printability, the first surface layer is generally subjected to a method for increasing the surface tension in a way known per se using corona, flame, or plasma. Typically, the surface tension in the first surface layer thus treated is then in a range from 35 to 45 mN/m.

The film according to the present invention is further distinguished by a reduced density, which is caused by vacuoles in the base layer, which simultaneously provide the film with an opaque appearance. "Opaque film" in the sense according to the present invention means an opaque film whose light transmission (ASTM-D 1003-77) is at most 70%, preferably at most 50%.

The base layer of the multilayer film contains polyolefin, preferably a propylene polymer, vacuole-initiating fillers, and possibly typical additives in the particular effective quantities. In general, the base layer contains at least 50 weight-percent, preferably 60 to 95 weight-percent, particularly 70 to 98 weight-percent, of the polyolefin, in each case in relation to the weight of the layer. In a further embodiment, the base layer may contain additional pigments, particularly $TiO_2$.

Propylene polymers are preferred as the polyolefins of the base layer. These propylene polymers contain 90 to 100 weight-percent, preferably 95 to 100 weight-percent, particularly 98 to 100 weight-percent propylene units and have a melting point of 120° C. or higher, preferably 150 to 170° C., and generally a melt-flow index from 1 to 10 g/10 minutes, preferably 2 to 8 g/10 minutes, at 230° C. and a force of 21.6 N (DIN 53735). Isotactic propylene homopolymers having an atactic proportion of 15 weight-percent or less, copolymers of ethylene and propylene having an ethylene content of 5 weight-percent or less, copolymers of propylene with $C_4$-$C_8$ olefins having an olefinic content of 5 weight-percent or less, terpolymers of propylene, ethylene, and butylene having an ethylene content of 10 weight-percent or less and having a butylene content of 15 weight-percent or less represent preferred propylene polymers for the base layer, isotactic propylene homopolymer being especially preferred. The weight-percents specified relate to the particular polymers.

Furthermore, a mixture made of the cited propylene homopolymers and/or copolymers and/or terpolymers and other polyolefins, particularly made of monomers having 2 to 6 C atoms, is suitable, the mixture containing at least 50 weight-percent, particularly at least 75 weight-percent propylene polymer.

Suitable other polyolefins in the polymer mixture are polyethylenes, particularly HDPE, MDPE, LDPE, VLDPE, and LLDPE, the proportion of these polyolefins not exceeding 15 weight-percent in relation to the polymer mixture in each case.

The opaque base layer of the film contains vacuole-initiating fillers in a quantity of at most 30 weight-percent, preferably 5 to 25 weight-percent, particularly 8 to 20 weight-percent, in relation to the weight of the opaque base layer.

According to the present invention, vacuole-initiating fillers are solid particles which are incompatible with the polymer matrix and lead to the formation of vacuole-like cavities when the film is stretched, the size, type, and number of the vacuoles being a function of the quantity and size of the solid particles and the stretching conditions such as the stretching ratio and stretching temperature. The vacuoles reduce the density and provide the film with a characteristic nacreous, opaque appearance, which arises due to light scattering at the boundaries "vacuole/polymer matrix". The light scattering at the solid particles themselves generally contributes comparatively little to the opacity of the film. Typically, the vacuole-initiating fillers have a minimum size of 1 μm, in order to lead to an effective, i.e., opaque-making quantity of vacuoles. In general, the average particle diameter of the particles is 1 to 6 μm, preferably 1.5 to 5 μm. The chemical character of the particles plays a subordinate role.

Typical vacuole-initiating fillers are inorganic and/or organic materials which are incompatible with polypropylene, such as aluminum oxide, aluminum sulfate, barium sulfate, calcium carbonate, magnesium carbonate, silicates such as aluminum silicate (kaolin clay) and magnesium silicate (talcum) and silicon dioxide, of which calcium carbonate and silicon dioxide are preferably used. The typically used polymers which are incompatible with the polymers of the base layer come into consideration as organic fillers, particularly copolymers of cyclic olefins (COC) as described in EP-A-0 623 463, polyesters, polystyrenes, polyamides, and halogenated organic polymers, polyesters such as polybutylene terephthalate and cyclo-olefin copolymers being preferred. Incompatible materials and/or incompatible polymers means, according to the present invention, that the material and/or the polymer exist in the film as separate particles and/or as a separate phase.

In a further embodiment, the base layer may contain additional pigments, in a quantity of 0.5 to 10 weight-percent, preferably 1 to 8 weight-percent, particularly 1 to 5 weight-percent, for example. The specifications relate to the weight of the base layer.

According to the present invention, pigments are incompatible particles which essentially do not result in vacuole formation upon stretching of the film. The coloring effect of the pigments is caused by the particles themselves. The term "pigments" is generally connected to an average particle diameter in the range from 0.01 to at most 1 μm and comprises both "white pigments", which color the films white, and also "color pigments", which provide the film with a colored or black color. In general, the average particle diameter of the pigments is in the range from 0.01 to 1 μm, preferably 0.01 to 0.7 μm, particularly 0.01 to 0.4 μm.

Typical pigments are materials such as aluminum oxide, aluminum sulfate, barium sulfate, calcium carbonate, magnesium carbonate, silicates such as aluminum silicate (kaolin clay) and magnesium silicate (talc), silicon dioxide, and titanium dioxide, of which white pigments such as calcium carbonate, silicon dioxide, titanium dioxide, and barium sulfate are preferably used. Titanium dioxide is especially preferred. Various modifications and coatings of $TiO_2$ are known per se in the related art.

In a preferred embodiment of the present invention, only the base layer of the film has vacuoles and the base layer contains no pigments such as $TiO_2$. For these embodiments, the density of the base layer is uniquely correlated to the "degree of voiding" or cavity volume of the base layer, i.e., the lower the density of the base layer, the more or larger the vacuoles are and therefore the more unstable the base layer is to delamination. The overall density of the film is, of course, additionally a function of the composition of the remaining layers, so that the density of the film as a whole may vary within relatively wide limits and nonetheless there may be a strongly foamed base layer having low density. For these embodiments, the density of the base layer is in a range from 0.35 to 0.6 g/cm$^3$, preferably 0.4 to 0.5 g/cm$^3$.

For embodiments which, in addition to the vacuole-initiating particles, contain pigments such as TiO$_2$ in the base layer, the density of the film will be comparatively higher. In this case, the density alone is not a unique measure of the degree of voiding, since in spite of a strongly foamed base layer, the density may lie in a typical scope due to the influence of the higher specific weight of the TiO$_2$ (density 4.2 g/cm$^3$). In general, the density of the base layer for these white-opaque embodiments is in a range from 0.4 to 0.9 g/cm$^3$, preferably 0.45 to 0.8 g/cm$^3$. For these special embodiments, the density of the film as a whole, depending on the TiO$_2$ content in the base layer, may be higher than 0.65 g/cm$^3$. In both cases (opaque and white-opaque base layer) the teaching according to the present invention allows the delamination tendency of the film, which is caused by an unstable base layer, to be improved, in that the initial tear resistance is increased by the selected surface layer described above.

According to the present invention, the density of the film for the white-opaque embodiments described may vary in a significantly larger range and is generally in a range from 0.45 to 0.95 g/cm$^3$, preferably 0.6 to 0.9 g/cm$^3$.

For the preferred embodiments without TiO$_2$ in the base layer, the density of the film is especially low and is in the range from 0.4 to 0.7 g/cm$^3$, preferably 0.45 to 0.65 g/cm$^3$, particularly 0.5 to 0.55 g/cm$^3$. These low densities offer a higher surface yield and lower costs to the end-user.

According to the present invention, a first intermediate layer is attached between the first surface layer and the base layer, i.e., one surface of this intermediate layer is bonded to the base layer and the second, diametrically opposing surface is bonded to the surface layer.

This intermediate layer of the multilayer film generally contains a polyolefin, preferably a propylene polymer, and essentially no vacuole-initiating fillers, but possibly further additives in the particular effective quantities and possibly pigments such as TiO$_2$. In general, the first intermediate layer contains at least 85 weight-percent, preferably 90 to <100 weight-percent, particularly 95 to <100 weight-percent of the polyolefin, each in relation to the weight of the layer. Because of this structure, the density of the first intermediate layer is at least 0.9 g/cm$^3$ and is in the range from 0.95 to 1.2 g/cm$^3$ for TiO$_2$— modified embodiments.

Propylene polymers are preferred as the polyolefins for the first intermediate layer. These propylene polymers contain 90 to 100 weight-percent, preferably 95 to 100 weight-percent, particularly 98 to 100 weight-percent propylene units and have a melting point of 120° C. or higher, preferably 150 to 170° C., and generally a melt-flow index from 0.5 to 8 g/10 minutes, preferably 2 to 5 g/10 minutes, at 230° C. and a force of 21.6 N (DIN 53735). Isotactic propylene homopolymers having an atactic proportion of 15 weight-percent or less, copolymers of ethylene and propylene having an ethylene content of 5 weight-percent or less, copolymers of propylene with C$_4$-C$_8$ olefins having an olefinic content of 5 weight-percent or less, terpolymers of propylene, ethylene, and butylene having an ethylene content of 10 weight-percent or less and having a butylene content of 15 weight-percent or less represent preferred propylene polymers for the core layer, isotactic propylene homopolymer being especially preferred. The weight-percents specified relate to the particular polymers.

Furthermore, a mixture made of the cited propylene homopolymers and/or copolymers and/or terpolymers and other polyolefins, particularly made of monomers having 2 to 6 C atoms, is suitable, the mixture containing at least 50 weight-percent, particularly at least 75 weight-percent propylene polymer. Suitable other polyolefins in the polymer mixture are polyethylenes, particularly HDPE, MDPE, LDPE, VLDPE, and LLDPE, the proportion of these polyolefins not exceeding 15 weight-percent in relation to the polymer mixture in each case.

In a preferred embodiment, the first intermediate layer contains pigments in a quantity of at most 15 weight-percent, preferably 1 to 10 weight-percent, particularly 2 to 8 weight-percent, in relation to the weight of the first intermediate layer.

Suitable pigments have already been described in detail in connection with the base layer. These may also be used in the first intermediate layer. TiO$_2$ is also preferred "as a pigment for this intermediate layer. The thickness of the first intermediate layer is generally 1 to 15 μm, preferably 1 to 10 μm.

The total thickness of the film is generally in a range from 20 to 120 μm, preferably 30 to 100 μm, particularly 50 to 90 μm.

In a preferred embodiment, the film, which is constructed from at least three layers, has even further layers. Four-layered and five-layered embodiments are especially advantageous, which have a second surface layer (four-layered films) on the diametrically opposing side of the base layer or additionally have a second intermediate layer and a second surface layer attached thereto (five-layered films).

The second surface layer generally contains at least 80 weight-percent, preferably 90 to <100 weight-percent, polyolefinic polymers or mixtures thereof. Suitable polyolefins are, for example, polyethylenes, propylene homopolymers (as described for the base layer), propylene copolymers, and/or propylene terpolymers.

Suitable propylene copolymers or terpolymers are generally made of at least 50 weight-percent propylene and have ethylene and/or butylene units as the comonomers. Preferred mixed polymers are random ethylene-propylene copolymers having an ethylene content of 2 to 10 weight-percent, preferably 0.5 to 8 weight-percent, or random propylene-butylene-1 copolymers having a butylene content from 4 to 25 weight-percent, preferably 10 to 20 weight-percent, each in relation to the total weight of the copolymers, or random ethylene-propylene-butylene-1 terpolymers having an ethylene content of 1 to 10 weight-percent, preferably 2 to 6 weight-percent, and a butylene-1 content of 3 to 20 weight-percent, preferably 8 to 10 weight-percent, each in relation to the total weight of the terpolymer. These copolymers and terpolymers generally have a melt-flow index of 3 to 15 g/10 minutes, preferably 3 to 9 g/10 minutes (230° C., 21.6 N DIN 53735) and a melting point of 70 to 145° C., preferably 90 to 140° C. (DSC).

Suitable polyethylenes are, for example, HDPE, MDPE, LDPE, LLDPE, VLDPE, of which the HDPE and MDPE types are especially preferred. HDPE generally has-a MFI (50 N/190° C.) of greater than 0.1 to 50 g/10 minutes, preferably 0.6 to 20 g/10 minutes, measured in accordance with DIN 53735 and a viscosity number, measured in accordance with DIN 53728, part 4, or ISO 1191, in the range from 100 to 450 cm$^3$/g, preferably 120 to 280 cm$^3$/g. The crystallinity is 35 to 80%, preferably 50 to 0.80%. The density, measured at 23° C. in accordance with DIN 53479, method A, or ISO 1183, is in the range from >0.94 to 0.96 g/cm$^3$. The melting point, measured using DSC (maximum of the melting curve, heating speed 20° C./minutes), is between 120 and 140° C. Suitable MDPE generally has a MFI (50 N/190° C.) of greater than 0.1 to 50 g/10 minutes, preferably 0.6 to 20 g/10 minutes, measured according to DIN 53735. The density, measured at 23° C. according to DIN 53479, method A, or ISO 1183, is in the range from >0.925 to 0.94 g/cm$^3$. The melting point, measured using DSC (maximum of the melting curve, heating speed 20° C./minutes), is between 115 and 130° C.

In regard to the use of the film as an in-mold label film, a mixture made of the propylene copolymers and/or terpolymers described and the polyethylenes cited is especially preferred for the second surface layer. These surface layer mixtures are advantageous for producing" a surface roughness which favorably influences bubble-free application and the adhesion of the label during the injection molding or blow molding process. For this purpose, surface layer mixtures containing HDPE and/or MDPE, having an HDPE or MDPE proportion from 10 to 50 weight-percent, particularly 15 to 40 weight-percent, are especially advantageous.

In principle, the second intermediate layer may, like the base layer described, be a vacuole-containing polypropylene layer having fillers in regard to the polymers and additives. The second intermediate layer may also be constructed like the first vacuole-free intermediate layer described or like the second surface layer described, embodiments using mixtures containing HDPE or MDPE to reinforce the roughness also being conceivable. In general, no TiO$_2$ is added to the second intermediate layer. Since this side faces toward the container in the use as a label film according to the present invention, the addition of TiO$_2$ to this layer provides no advantages. The thickness of the second intermediate layer is 1 to 15 μm, preferably 2 to 10 μm.

In a further embodiment of the present invention, the film may be metal coated on the surface of the first surface layer. For this purpose, the typical methods, such as thermal vaporization, sputtering, electron beam vaporization, and similar methods may be used. Preferably, an aluminum layer, in a thickness from 10 to 200 nm, for example, is applied according to one of the cited methods. These embodiments are distinguished by a special metallic gloss, which may be especially desirable for high-value label applications.

In order to improve specific properties of the polyolefin film according to the present invention even further, the base layer, the intermediate layer(s), and even the surface layer(s) may contain further additives in the particular effective quantities, preferably antistatic agents and/or antiblocking agents and/or lubricants and/or stabilizers and/or neutralization agents, which are compatible with the propylene polymers of the base layer and the surface layer(s), with the exception of the antiblocking agents, which are generally incompatible and are preferably used in the surface layer(s). All specifications of quantity in weight-percent in the following embodiment relate to the layer or layers to which the additive may be added.

Preferred antistatic agents are alkali-alkane sulfonates, polyether-modified, i.e., ethoxylated and/or propoxylated polydiorganic siloxanes (polydialkyl siloxanes, polyalkyl phenyl siloxanes, and the like) and/or the essentially straight-chain and saturated aliphatic, tertiary amines having an aliphatic residue having 10 to 20 carbon atoms, which are substituted with hydroxy-($C_1$-$C_4$)-alkyl groups, N, N-bis-(2-hydroxyethyl)-alkyl amines having 10 to 20 carbon atoms, preferably 12 to 18 carbon atoms, being especially suitable in the alkyl residue. The effective quantity of antistatic agent is in the range from 0.05 to 0.3 weight-percent. Furthermore, glycerin monostearate is preferably used as an antistatic agent in a quantity from 0.03% to 0.2%.

Suitable antiblocking agents are inorganic additives such as silicon dioxide, calcium carbonate, magnesium silicate, aluminum silicate, calcium phosphate, and the like, and/or incompatible organic polymers such as polyamides, polyesters, polycarbonates, and the like, benzoguanamine formaldehyde polymers, silicon dioxide, and calcium carbonate being preferred. The effective quantity of antiblocking agent is in the range from 0.1 to 2 weight-percent, preferably 0.1 to 0.5 weight-percent. The average particle size is between 1 and 6 μm, particularly 2 and 5 μm, particles having a spherical shape, as described in EP-A-0 236 945 and DE-A-38 01 535, being especially suitable. The antiblocking agents are preferably added to the surface layers.

Lubricants are higher aliphatic acid amides, higher aliphatic acid esters, waxes, and metal soaps, as well as polydimethyl siloxanes. The effective quantity of lubricant is in the range from 0.1 to 3 weight-percent. The addition of higher aliphatic acid amides in the range from 0.15 to 0.25 weight-percent to the base layer and/or the surface layers is especially suitable.

A particularly suitable aliphatic acid amide is erucic acid amide. The addition of polydimethyl siloxanes in the range from 0.3 to 2.0 weight-percent is preferred, particularly polydimethyl siloxanes having a viscosity from 10,000 to 1,000,000 mm$^2$/second. The addition of the polydimethyl siloxanes to one or both surface layers is especially favorable.

The typical stabilizing compounds for ethylene, propylene, and other olefin polymers may be used as stabilizers. The quantity added is between 0.05 and 2 weight-percent. Phenolic stabilizers, alkaline/alkaline earth stearates, and/or alkaline/alkaline earth carbonates are especially suitable. Phenolic stabilizers are preferred in a quantity from 0.1 to 0.6 weight-percent, particularly 0.15 to 0.3 weight-percent, and having a molecular mass of more than 500 g/mol. Pentaerythrityl-tetrakis-3-(3,5-di-tertiary butyl-4-hydroxyphenyl)-propionate or 1,3,5-trimethyl-2,4,6-tris(3,5-di-tertiary butyl-4-hydroxybenzyl) benzene are especially advantageous.

Neutralization agents are preferably calcium stearate and/or calcium carbonate and/or synthetic dihydrotalcite (SHYT) of an average particle size of at most 0.7 μm, an absolute particle size of less than 10 μm, and a specific surface area of at least 40 m$^2$/g. In general, neutralization agents are used in a quantity of 50 to 1000 ppm in relation to the layer.

Furthermore, the present invention relates to a method for manufacturing the multilayer film according to the present invention according to coextrusion methods known per se, the stenter method being particularly preferred.

In the course of this method, the melts corresponding to the individual layers of film are coextruded through a flat die, the film thus obtained is drawn onto one or more roller(s) for solidification, the film is subsequently stretched (oriented), and the stretched film is thermally fixed and possibly plasma, corona, or flame treated on the surface layer provided for treatment.

Specifically, as, is typical in the extrusion method, for this purpose the polymer and/or the polymer mixture of the individual layers is compressed in an extruder and liquefied, the vacuole-initiating fillers and other possibly added additives already able to be contained in the polymer and/or in the polymer mixture. Alternatively, these additives may also be incorporated via a masterbatch.

The melts are then simultaneously pressed through a flat die (sheet die), and the extruded multilayer film is drawn off on one or more take-off rollers at a temperature from 5 to 100° C., preferably 10 to 50° C., so that it cools down and solidifies.

The film thus obtained is then stretched longitudinally and transversely to the extrusion direction, which leads to an orientation of the molecular chains. The longitudinal stretching is preferably performed at a temperature from 80 to 150° C., expediently with the aid of two rollers running at different speeds corresponding to the stretching ratio desired, and the transverse stretching is preferably performed at a temperature from 120 to 170° C. with the aid of a corresponding tenter frame. The longitudinal stretching ratios are in the range from 4 to 8, preferably 4.5 to 6. The transverse stretching ratios are in the range from 5 to 10, preferably 7 to 9.

The stretching of the film is followed by thermal fixing (heat treatment), the film being held approximately 0.1 to 10 seconds long at a temperature from 100 to 160° C. The film is subsequently rolled up in a typical way using a winding device.

Preferably, one or both surfaces of the film are plasma, corona, or flame treated according to one of the known methods after the biaxial stretching. The treatment intensity is generally in the range from 35 to 50 mN/m, preferably 37 to 45 mN/m, particularly 39 to 40 mN/m.

For the alternative corona treatment, the film is guided between two conductor elements used as electrodes, such a high voltage being applied between the electrodes, usually alternating voltage (approximately 10,000 V and 10,000 Hz), that spray or corona discharges may occur. Through the spray or corona discharge, the air above the film surface is ionized and reacts with the molecules of the film surface, so that polar intercalations arise in the essentially nonpolar polymer matrix. The treatment intensities are in the typical scope, 35 to 45 mN/m being preferred.

The following measuring methods were used to characterize the raw materials and the films:

Melt-Flow Index

The melt-flow index was measured according to DIN 53735 at 21.6 N load and 230° C.

Light Transmission

The light transmission was measured in accordance with ASTM-D 1003-77.

Turbidity

The turbidity of the film was measured in accordance with ASTM-D 1003-52.

Gloss

The gloss was determined according to DIN 67530. The reflector value was measured as the optical characteristic for the surface of a film. On the basis of the norms ASTM-D 523-78 and ISO 2813, the angle of incidence was set at 20° (or 60° for matte surfaces). A light beam is incident at the set angle of incidence on the flat testing surface and is reflected and/or scattered therefrom. The light beams incident on the photoelectronic receiver are displayed as the proportional electrical variable. The measured value is dimensionless and must be specified with the angle of incidence.

Opacity and Degree of Whiteness

The opacity and degree of whiteness were determined with the aid of the electronic remission photometer. The opacity was determined in accordance with DIN 53146. The degree of whiteness was defined as WG=RY+3RZ−3RX, WG being the degree of whiteness, and RY, RZ, RX being corresponding reflection factors when using the Y, Z, and X color measurement filters. A blank made of barium sulfate (DIN 5033 part 9) was used as the white standard. There is an extensive description, for example, in Hansl Loos "Farbmessungen [Color Measurements]", Verlag Beruf und Schule, Itzehoe (1989).

Determination of the Ethylene Content

The ethylene content of the copolymers was determined using $^{13}C$ NMR spectroscopy. The measurements were performed using a nuclear resonance spectrometer from Bruker Avance 360. The copolymer to be characterized was dissolved in tetrachloroethane, so that a 10% mixture resulted. Octamethyl tetrasiloxane (OMTS) was added as a reference standard. The nuclear resonance spectrum was measured at 120° C. The spectra were analyzed as described in J. C. Randall, Polymer Sequence Distribution (Academic Press, New York, 1977).

Melting Point and Melting Enthalpy

The melting point and the melting enthalpy were determined using DSC (differential scanning calorimetry) measurement (DIN 51007 and DIN 53765). Several milligrams (3 to 5 mg) of the raw material to be characterized were heated in a differential calorimeter at a heating speed of 20° C. per minute. The thermal flux was plotted against the temperature and the melting point was determined as the maximum of the melting curve and the melting enthalpy was determined as the area of the particular melting peak.

Density

The density was determined in accordance with DIN 53479, method A.

Initial Tear Resistance

To determine the initial tear resistance, the surface layer according to the present invention of the film was sealed against a transparent sealable packaging film (type Trespaphan GND 30). For this purpose, two 15 mm wide film strips were laid one on top of another and sealed at a temperature of 130° C. and a sealing time of 0.5 seconds and a sealing pressure of 10 N/cm$^2$ in a sealing device HSG/ETK from Brugger. Subsequently, the two strips were pulled apart according to the T peel method. In this case, the force-distance diagram during peeling was measured in the usual way. The maximum force before tearing of the sealed sample was specified as the initial tear resistance.

Surface Tension

The surface tension was determined via ink methods according to DIN 53364.

The present invention will now be explained by the following examples.

EXAMPLE 1

A five-layered, precursor film was extruded according to the coextrusion method from a sheet die at an extrusion temperature of 240 to 250° C.

This precursor film was first drawn off on a cooling roller and cooled down. Subsequently, the precursor film was oriented in the longitudinal and transverse directions and finally fixed. The surface of the first surface layer was pre-treated using corona to increase the surface tension. The five-layered film had a layer construction of first surface layer/first intermediate layer/base layer/second intermediate layer/second surface layer. The individual layers of the film had the following composition:

| First surface layer (1.0 μm): | |
|---|---|
| 100 weight-percent | ethylene-propylene copolymer having an ethylene proportion of 1.7 weight-percent (in relation to the copolymer) and a melting point of 155° C.; and a melt-flow index of 8.5 g/10 minutes at 230° C. and 2.16 kg load (DIN 53735) and a melting enthalpy of 96.9 J/g |

| First intermediate layer (4 μm): | |
|---|---|
| 100 weight-percent | propylene homopolymer (PP) having an n-heptane-soluble proportion of 4.5 weight-percent (in relation to 100% PP) and a melting point of 165° C.; a melt, flow index of 3.2 g/10 minutes at 230° C. and 2.16 kg load (DIN 53735) |

| Base layer | |
|---|---|
| 86.6 weight-percent | propylene homopolymer (PP) having an n-heptane-soluble proportion of 4.5 weight-percent (in relation to 100% PP) and a melting point of 165° C.; and a melt flow index of 3.2 g/10 minutes at 230° C. and 2.16 kg load (DIN 53735) |
| 10 weight-percent | calcium carbonate having an average particle diameter of 3.5 μm |
| 3 weight-percent | titanium dioxide having an average particle diameter of 0.1 to 0.3 μm |
| 0.2 weight-percent | tertiary aliphatic amine as an antistatic agent (Armostat 300) |
| 0.2 weight-percent | erucic acid amide as a lubricant (ESA) |

| Second intermediate layer (4 μm) | |
|---|---|
| 100 weight-percent | propylene homopolymer (PP) having an n-heptane-soluble proportion of 4.5 weight-percent (in relation to 100% PP) and a melting point of 165° C.; and a melt flow index of 3.2 g/10 minutes at 230° C. and 2.16 kg load (DIN 53735) |

| Second surface layer(3 μm): | |
|---|---|
| 65 weight-percent | ethylene-propylene copolymer having an ethylene proportion of 4 weight-percent (in relation to the copolymer) and a melting point of 136° C.; and a melt-flow index of 7.3 g/10 minutes at 230° C. and 2.16 kg load (DIN 53735) and a melting enthalpy of 64.7 J/g |
| 34.8 weight-percent | polyethylene having a density of 0.93 g/cm$^3$ and a melt-flow index (190° C. and 50 N) of 0.8 g/10 minutes |
| 0.2 weight-percent | antiblocking agent having an average particle diameter of approximately 4 μm (Sylobloc 45) |

All layers of the film additionally contained stabilizer and neutralization agent in typical quantities.

The following specific conditions and temperatures were selected during manufacturing of the film:

Extrusion: extrusion temperature approx. 245° C.
Cooling roller: temperature 25° C.
Longitudinal stretching: T=105° C.
Longitudinal stretching by the factor 5
Transverse stretching: T=149° C.
Transverse stretching by the factor 9
Fixing T=143° C.

The film was surface treated on the surface of the first surface layer using corona and had a surface tension of 38 mN/m. The film had a thickness of 60 μm.

EXAMPLE 2

A film was manufactured according to Example 1. In contrast to Example 1, the first surface layer additionally contained 0.1 weight-percent antiblocking agent (Sylobloc 45). The content of propylene copolymer in the surface layer was correspondingly reduced.

COMPARATIVE EXAMPLE 1

A film was manufactured as described in Example 1. In contrast to Example 2, the composition of the first surface layer was altered. The first surface layer now contained 99.9 weight-percent of a random propylene-ethylene copolymer having an ethylene proportion of 4 weight-percent (in relation to the copolymer), a melting point of 136° C.; a melt-flow index of 7.3 g/10 minutes at 230° C. and 2.16 kg load (DIN 53735) and a melting enthalpy of 64.7 J/g.

COMPARATIVE EXAMPLE 2

A film was manufactured as described in Example 1. In contrast to Example 1, the composition of the first surface layer was changed. The first surface layer now contained propylene homopolymer (PP) having an n-heptane-soluble proportion of 4.5 weight-percent (in relation to 100% PP) and a melting point of 165° C.; and a melt flow index of 3.2 g/10 minutes at 230° C. and 2.16 kg load (DIN 53735).

The properties of the films according to the examples and the comparative examples are listed in Table 1. It was shown that the films according to the present invention according to Examples 1 and 2 have outstanding initial tear resistances and simultaneously have all essential properties for the use of the film as an in-mold label, particularly a high surface tension which is stable for long time.

TABLE 1

| | | Example | | |
|---|---|---|---|---|
| | Ex. 1 | Ex. 2 | Comp. ex. 1 | Comp. ex. 2 |
| Thickness μm | 58 | 62 | 59 | 60 |
| Density g/cm$^3$ | 0.53 | 0.52 | 0.52 | 0.53 |
| Gloss at 20° | 28.0 | 23.7 | 22.2 | 29.5 |
| Opacity % | 86.3 | 87.2 | 87.3 | 86.7 |
| Degree of whiteness % | 79.8 | 82.0 | 81.5 | 80.5 |
| Surface tension mN/m  Immediate Value | 39 | 39 | 39 | 39 |
| Surface tension mN/m  After 3 months | 38 | 38 | 38 | 35 |
| Initial tear resistance N/15 mm | 3.5 | 3.2 | 2.3 | 3.5 |

What is claimed is:

1. A biaxially oriented opaque polypropylene multilayered film in the form of an in-mold label made of a base layer and at least one first intermediate layer positioned thereon and a first surface layer positioned on the first intermediate layer, characterized in that the first intermediate layer has essentially no vacuoles and the first surface layer contains at least 80 weight-percent of a propylene-ethylene copolymer, which has an ethylene content from 1.2 to <2.8 weight-percent and a propylene content of 97.2-98.8 weight-percent and a melting point in the range from 145 to 160° C. and a melting enthalpy of 80 to 110 J/g and the base layer contains vacuole-initiating fillers and has a density in the range from 0.35 to 0.6 g/cm$^3$ and contains no pigments and the density of the overall film is in the range from 0.4 to 0.7 g/cm$^3$.

2. The film according to claim 1, characterized in that the propylene-ethylene copolymer contains 1.5 to 2.3 weight-percent ethylene and has a melting point in the range from 150 to 155° C. and a melting enthalpy of 90 to 100 J/g.

3. The film according to claim 1, characterized in that the surface layer additionally contains propylene homopolymer, propylene copolymer, and/or propylene terpolymer, these polymers being different from the first propylene copolymer and the propylene content of these polymers being at least 80 weight-percent, and their proportion in the surface layer being at most 20 weight-percent, preferably 2 to 10 weight-percent.

4. The film according to claim 1, characterized in that the thickness of the first surface layer is 0.5 to 3 μm.

5. The film according to claim 1, characterized in that the surface of the first surface layer is pre-treated using corona, plasma, or flame.

6. The film according to claim 1, characterized in that the base layer made of propylene homopolymer contains 5 to 30 weight-percent vacuole-initiating fillers.

7. The film according to claim 1, characterized in that the first intermediate layer is made of at least 50 weight-percent, preferably 80 to 90 weight-percent propylene homopolymer and additionally contains 1 to 15 weight-percent TiO$_2$.

8. The film according to claim 1, characterized in that a second surface layer is applied to the diametrically opposing side of the base layer and the film is four-layered.

9. The film according to claim 1, characterized in that the second surface layer contains at least 80 to <100 weight-percent of a polymer mixture, the mixture comprising propylene polymers having at least 80 weight-percent propylene units and a polyethylene and the mixture containing 10 to 50 weight-percent of the polyethylene in relation to the weight of the mixture.

10. The film according to claim 1, characterized in that the first and/or the second surface layer contains an antiblocking agent.

11. The film according to claim 1, characterized in that a second intermediate layer is applied between the base layer and the second surface layer and the film is five-layered.

12. The film according to claim 1, characterized in that the second intermediate layer contains 5 to 20 weight-percent vacuole-initiating particles.

13. The film according to claim 1, characterized in that the base layer additionally contains antistatic agent and lubricant.

14. The film according to claim 1, characterized in that the first and/or the second intermediate layer contains antistatic agent and/or lubricant.

15. The film according to claim 1, characterized in that the first and/or the second surface layer additionally contains antiblocking agent and/or lubricant and/or antistatic agent.

16. The film according to claim 1, characterized in that the first surface layer is provided with printing which does not cover its entire area.

17. The film according to claim 1 for the in-mold labeling when injection molding containers from thermoplastic, preferably polyethylene or polypropylene, characterized in that the side of the film diametrically opposite the first surface layer faces toward the container during labeling and the first surface layer forms the outside of the label.

18. A biaxially oriented opaque polypropylene multilayered film in the form of an in-mold label made of a base layer and at least one first intermediate layer positioned thereon and a first surface layer positioned on the first intermediate layer, characterized in that the first intermediate layer has essentially no vacuoles and the first surface layer contains at least 80 weight-percent of a propylene-ethylene copolymer, which has an ethylene content from 1.2 to <2.8 weight-percent and a propylene content of 97.2-98.8 weight-percent and a melting point in the range from 145 to 160° C. and a melting enthalpy of 80 to 110 J/g and the base layer contains vacuole-initiating fillers and has a density in the range from 0.4 to 0.9 g/cm$^3$ and additionally contains TiO$_2$ and the density of the overall film is in the range from 0.45 to 0.95 g/cm$^3$.

* * * * *